Patented Sept. 15, 1931

1,823,239

UNITED STATES PATENT OFFICE

ARMANDO CERVI, OF NEW YORK, N. Y., ASSIGNOR TO THE RADIUM EMANATION CORPORATION, OF NEW YORK, N. Y., A CORPORATION OF DELAWARE

EMANATION SEED

No Drawing. Application filed January 16, 1926. Serial No. 81,856.

My invention relates to metal seeds containing radium emanation adapted to be implanted in biological tissue.

It has heretofore been proposed to implant metal seeds containing radium emanation in tissue, the metal screen functioning to absorb or filter the beta ray which has a caustic or burning effect on the tissue and allowing the gamma ray to act on the tissue. The gamma ray is, of course, the desirable ray for the treatment of tissue. The metal seeds above referred to may be made of platinum gold or silver or of alloys of gold, silver and platinum. Platinum iridium alloys containing about 10% of iridium have the same absorption power as platinum and are suitable.

Practically all metals induce secondary beta radiation when struck by gamma rays and this secondary beta radiation is caustic and has a burning effect on tissue. Seed metal screens as above indicated are usually made of heavy metals and, since the hardness of the beta ray given off by the impinging of a gamma ray on a metal, is directly proportional to the atomic weight of the metal, it can readily be seen that the secondary beta radiation given off by the metal seeds in common use is very caustic.

It is the object of this invention to provide metal seeds which will substantially eliminate the secondary beta radiation.

This elimination of the caustic secondary beta radiation can be accomplished by covering the outer surface of the metal screen with a material that will absorb the secondary beta radiation, the material being of such a nature that no appreciable secondary beta radiation is given off therefrom when gamma rays impinge on its molecules.

Examples of suitable substances are soft rubber, hard rubber, collodion, resins, both artificial and synthetic, resinous materials, waxes, paraffin, agar agar, condensation compounds which are initially soft but harden on cooling, solutions of organic materials which harden when the solvent is evaporated therefrom, and paints made from powdered metals of low atomic weight. The preferred paint coating is one containing aluminum since the latter has the lowest atomic weight of all metals. When an aluminum coating is applied to a platinum seed, the radiation of the secondary beta ray is materially reduced. As is well known the hardness, and therefore the caustic effect of the beta ray on tissue is directly proportional to the atomic weight of the metal from which it is given off. Aluminum will absorb the secondary beta radiation from platinum and the secondary beta radiation given off by the aluminum will be very mild, due to the low atomic weight thereof, and the caustic effect of the secondary beta ray will be reduced or substantially for practical purposes eliminated.

It is to be distinctly understood that the nature of the coating substance is immaterial as long as it functions to totally eliminate or substantially reduce the secondary beta radiation.

I claim:—

1. As a new article of manufacture, a metal seed containing radium emanation and carrying on its outer surface, agar agar adapted to eliminate the secondary beta radiation.

2. As a new article of manufacture, a metal seed containing radium emanation and coated with agar-agar adapted to eliminate the secondary beta radiation.

In testimony whereof he hereunto affixes his signature.

ARMANDO CERVI.